United States Patent

Pompa

Patent Number: 4,743,061
Date of Patent: May 10, 1988

[54] MOTOR VEHICLE SUN SHIELD FOR CURVED SIDE WINDOWS

[76] Inventor: J. Benedict Pompa, 4805 U.S. Alt. 19 N., #412, Palm Harbor, Fla. 34683

[21] Appl. No.: 64,660

[22] Filed: Jun. 22, 1987

[51] Int. Cl.$^4$ .................................................. B60J 3/00
[52] U.S. Cl. ................................. 296/97 R; 296/97 F
[58] Field of Search ................. 296/97 R, 97 F, 97 D, 296/97 K; 160/DIG. 2

[56] References Cited

U.S. PATENT DOCUMENTS

| | | | |
|---|---|---|---|
| 2,917,111 | 12/1959 | Clarke | 296/97 F |
| 3,025,098 | 3/1962 | Andrews | 296/97 R |
| 3,454,301 | 7/1969 | Lehmann | 296/97 R |
| 4,560,251 | 12/1985 | Mürjahn | 296/97 R |

FOREIGN PATENT DOCUMENTS

8300116  8/1984  Netherlands .

*Primary Examiner*—Robert R. Song

[57] ABSTRACT

A motor vehicle sun shield for use on compound curved side windows, to protect occupant's face and eyes from excessive sunlight impingement, the sun shield consisting of a generally rectangular panel of rigid tinted plastic film, bendably conformable to the window surface in the vehicle frontal and horizontal planes, having a longitudinal stiffening and inwardly biasing permanent bend near to and parallel to its upper edge, and including two spring wire mounting clips, frictionally attached and secured by perforated tabs to the panel upper edge, their opposite ends being U-shaped in form and dimensioned to fit over and grip the top edge of vehicle side windows of various thicknesses and curvatures, and to exert a rotary force pulling the panel into intimate contact with the window surface, the clips being of minimal frictional cross section and having rotational freedom allowing two point adaptive and warpless mounting of the sun shield to the curved upper window edge, delineated in the vehicle profile plane.

4 Claims, 1 Drawing Sheet

MOTOR VEHICLE SUN SHIELD FOR CURVED SIDE WINDOWS

This invention relates to a new and structurally unique tinted transparent plastic sun shield for use in automobiles and trucks, which is attachable and adaptable to the top edges and surfaces of the vehicle's side windows, particularly side windows having compound curvatures, and which supplements the usual permanently installed vehicle sun visor in shielding the face and eyes of the vehicle's occupants from excessive sunlight impingement through the side windows.

In many motor vehicles, the regular front window sun visor is too short to cover and shield all of the top portion of the side window when it is used for this purpose. This is especially true of 2-door automobiles and trucks with large front doors. In 4-door automobiles, sun visors are generally not provided for occupants in the back seats. Consequently, the vehicle occupants are very often subjected to uncomfortable heat and glare of the sunlight entering through the side windows. Installation of permanent window tinting film is now being used to solve this problem but for many persons this process is too costly. Others consider window tinting dangerous because it drastically reduces vision of traffic through the side windows, especially at night.

Automobile side window sun shades are available to help solve this problem but they generally have disadvantages of being costly, complex, lacking portability and possessing optical distortions due to use of more highly plasticized flexible films, which they generally require. Their usual mounting method is by means of suction cups, which have a tendency in hot sunny climates to dry out and release when least expected. More positive continuous channel and partial channel top window edge mounts have been used for automobile sun shades but these designs no longer can adapt to top edge mounting on modern motor vehicles possesing highly curved side windows, various window thicknesses, and tighter window weatherstripping.

Accordingly, it is the main object of this invention to provide a novel motor vehicle sun shield so structured that it is positively mountable to the top edge and adaptable to the upper inner surfaces of vehicle side windows of various compound curvatures, and glass thicknesses.

Another object is to provide a motor vehicle sun shield capable of being mounted on the top edge of curved side windows, without warping or wrinkling of the sun shield surface, and having mounting means capable of ingressing and engressing the upper window weatherstripping without jamming therein.

A further object is to provide a motor vehicle sun shield requiring only single hand manipulation and which can be easily and positively attached and detached for shifting between side windows, or removed for nighttime driving.

A final object of this invention is to provide a motor vehicle side window sun shield which is of the utmost simplicity in design, economical to produce, yet effective and dependable in operation.

These and other advantages will become apparent in the course of the specification, reference being had to the accompanying drawings forming a part thereof, wherein like numerals refer to like parts throughout, and in which.

Figure 1:
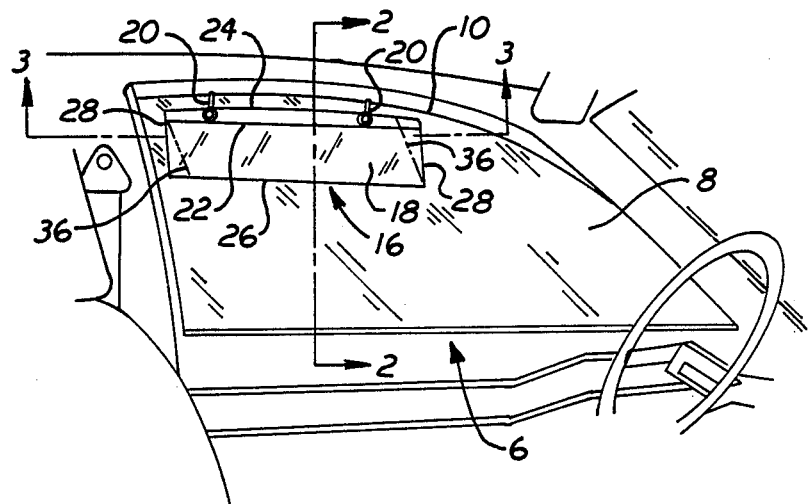
FIG. 1 is basically a fragmentary interior elevational view of an automobile front door, with the sun shield of the instant invention operatively associated on the curved window thereof, with said window lowered somewhat from its closed position.
Figure 2:
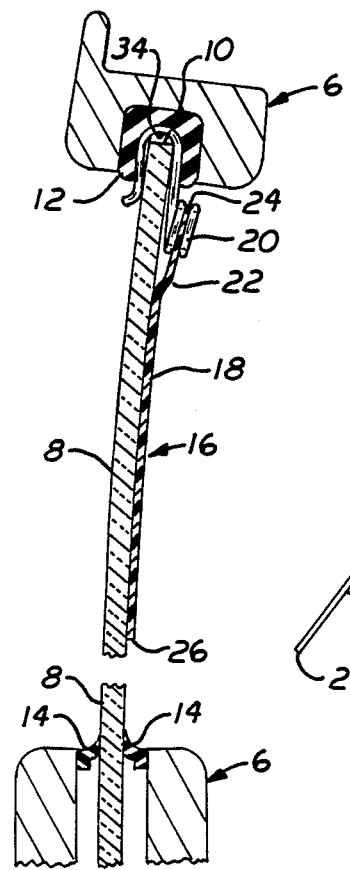
FIG. 2 is an enlarged fragmentary sectional view taken on line 2—2 of FIG. 1, looking in the direction of the arrows, but with the window shown in its closed position and with the window frame parts of the door shown in simplified form.

Referring to FIG. 1, the upper portion of an automobile front door is shown and includes the entire side window area of the door. The door is designated in general by the numeral 6. The vertically movable window contained within the door is designated by the numeral 8. As seen in FIG. 2, the top edge 10 of the window 8 slides into the resilient upper door weatherstripping 12 which secures and seals the window 8, protecting the automobile interior from outside weather conditions. The window 8 is secured and sealed along the bottom edge of the door's window opening by the lower resilient weatherstripping 14.

The sun shield of the instant invention is designated as an entity by the numeral 16, and consists of three parts, a shield panel 18 and two attached mounting clips 20.

The shield panel 18 is the principal component of the sun shield 16 and is made of suitably tinted, but transparent, rigid plastic film. Preferred tinting colors have been found to be green, grey or bronze. The proportion of sunlight passing through the shield panel 18 is controlled by the degree of tinting of the plastic, which can be easily varied in manufacture. The shield panel 18 may also be translucent or opaque and is generally, but not necessarily, rectangular in shape. A configuration similar in length and width to the usual vehicle sun visor has been found to be the best compromise size for use on most motor vehicles. Although it is made of rigid film, the shield panel 18 is thin enough to be easily curved when mildly loaded, but possesses enough inherent elasticity to spring back to its original form when the load force is removed.

Figure 3:
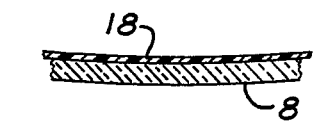
FIG. 3 is a fragmentary view taken substantially upon the plane indicated by section line 3—3 of FIG. 1.

The shield panel 18 is permanently bent along a line 22 near to and parallel to its upper side 24. This longitudinal bend 22 increases the rigidity of the entire shield panel 18 for easier handling and permits use of thinner panel material for reasons of economy. As best seen in FIG. 2, the offset longitudinal bend 22 biases most of the shield panel 18 and particularly its lower edge 26 into tight conformation with the surface of the window 8, in the installed mode. The shield panel 18 easily deflects to assume the compound contours of the window 8 in the frontal and horizontal planes as shown in FIG. 2 and FIG. 3 respectively. This tight conformation eliminates vibration of the shield panel 18 against the window 8 and facilitates passage of the shield panel 18 past the lower weatherstripping 14, when the window 8 is rolled down. A final function of the longitudinal bend 22 is to create a reactive rotary force on the mounting clips 20, increasing their gripping pressure on the window 8. This helps ensure that the frictional gripping force between the clips 20 and the window 8 will always exceed the frictional force between the clips 20 and the upper door weatherstripping 12, so that the sun shield 16 will remain on the window 8 when the latter is lowered from the fully closed position.

Figure 4:
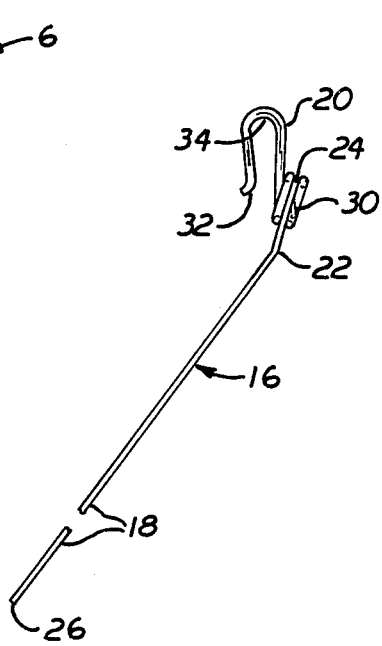
FIG. 4 is a side elevational view of the sun shield of the instant invention showing the alignment of said sun shield's components in a free uninstalled state.
Figure 5:
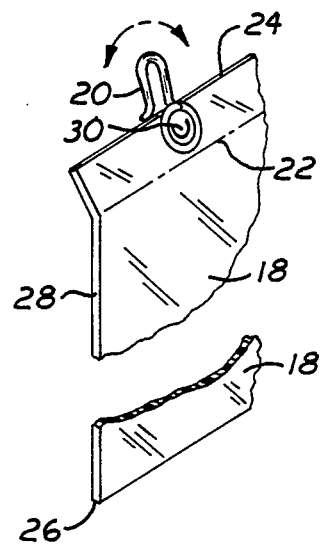
FIG. 5 is a fragmentary perspective view of the corner areas of the sun shield.

Two spring wire mounting clips, best described as U-shaped, are attached to the upper longitudinal edge 24 of the shield panel 18, suitably equidistant from its vertical edges 28. The clips 20 have one end terminating in two complete coil turns which create a convenient friction clip which slides over the top edge 24 of the shield panel 18 so as to clamp the panel between the two coils (FIGS. 2 and 4). The clips 20 are more positively fixed to the shield panel 18 by semi-circular projection tabs 30, pressed into the surface of the panel 18, within the coils, as shown in FIG. 5. These projection tabs 30 prevent backing off of the clips 20, through interference with one of the coils. The mounting clips 20, however, are free to rotate to a certain degree as shown in FIG. 5. The gripping span of the mounting clip 20 is sufficient to fit over the top edge of most motor vehicle side windows of various thicknesses. As seen in FIG. 4, the span at the open side at the pressure point 32 of the clip 20 is less than at the closed side 34 so that the clip 20 will always exert compressive pressure, even on thin windows. The end portion of the clip 20 is turned up to slide more smoothly over the upper edge 10 of the window surface 8 without scratching it. FIG. 2 shows the clip closed bight end 34 to be located a sufficient distance from the upper panel edge 24 so that the shield panel 18 will not enter the upper weatherstripping 12 when the window is completely closed. Finally, the mounting clips 20 are made of the minimal, functional cross section so as to penetrate and exit the upper resilient weatherstripping 12 with the least amount of friction. This reduces the tendency for the clips 20 to stick in the upper weatherstripping 12 when the window 8 lowered.

The shield panel 18 is not flexible in the vehicle profile (vertical) plane, portrayed in FIG. 1, but adapts to the window upper curved edge 10 in this plane by means of two point mounting provided by the aforementioned clips 20. The top edge 24 of shield panel 18 bridges the window upper curved edge 10, much like a chord line across a circular arc. The rotational freedom of the mounting clips 20 prevent any rotary forces from being transmitted back, parallel to the flat surface of the shield panel 20, to wrinkle or warp it. In certain motor vehicles with severely raked small side windows, the shield panel 18 may be custom cut to the window shape, for example, along lines 36 with ordinary scissors.

The capability of the sun shield 16 to be mounted to the top edge of a compound curved motor vehicle side window and in intimate conformity with the window surface, without wrinkling or warping of the sun shield surface and without jamming of the mounting means either on the window edge or within the vehicle upper window weatherstripping, distinguishes this invention from prior analogous inventions and constitutes the basis for which the novelty of the present invention is predicated.

In operation, when it is desired to utilize the sun shield 16, the occupant rolls the motor vehicle's side window 8 down a few inches and grasping the lower edge of the shield panel 18, positions the ends of both mounting clips 20 over the upper window edge 10 and pulls down to fully seat the clips 20. The window may then be rolled up. To remove the sun shield 16, the window 8 is again rolled down a few inches; the operator grasps the lower part of the shield panel 18 and pushes up. Removal can also be effected by placing the fingers of one's hand on the slightly protruding area below the longitudinal bend line 22, and pushing up to release the mounting clips 20. The sun shield 16, when not in use, may be conveniently stowed behind the regular vehicle sun visor, since they are similar in size.

The foregoing specific embodiments of the invention are illustrative only of the principles of the invention. Numerous minor modifications and equivalents may be resorted to, falling within the scope of the invention as claimed.

What is claimed as new is as follows:

1. A sun shield structurally and functionally adapted to be mounted to the top edge of motor vehicle curved side windows comprising: in combination, a shield panel of rigid plastic film, flexibly conformable but elastic in two mutually perpendicular planes, but not flexible in the third mutually perpendicular plane, having a permanent stiffening and inwardly biasing longitudinal bend near to and parallel to said shield panel's upper edge, and two spring wire mounting clips of minimal functional and frictional cross section disposed on the top edge and inboard of said shield panel's vertical edges, said mounting clips havng one end terminating in two coil loops between which said shield panel's top edge is frictionally engaged, said mounting clips being positively secured, while retaining rotational freedom, to said shield panel by semi-circular projection tabs pressed into said shield panel's surface within the coil loops, the opposite end of said mounting clips being generally U-shaped and aligned radially from said coil loops with the bight portion of the U suitably remote from said shield panel's upper edge and the open end of said mounting clips suitably adapted to smoothly fit over and clamp the top edge of the vehicle side window.

2. The structure according to claim 1, and wherein said shield panel is tinted and transparent.

3. The structure according to claim 2, and wherein said tinting is grey, bronze or green in hue.

4. The structure according to claim 1, and wherein said shield panel is translucent or opaque and of any color.

* * * * *